(12) United States Patent  (10) Patent No.: US 12,511,906 B2
Li  (45) Date of Patent: Dec. 30, 2025

(54) CAMERA SHOOTING PARAMETER ADJUSTMENT METHOD AND APPARATUS, AND ELECTRONIC DEVICE

(71) Applicant: VIVO MOBILE COMMUNICATION CO., LTD., Guangdong (CN)

(72) Inventor: Mingzheng Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/645,892

(22) Filed: Apr. 25, 2024

(65) Prior Publication Data

US 2024/0273909 A1 Aug. 15, 2024

Related U.S. Application Data

(63) Continuation of application No. PCT/CN2022/126667, filed on Oct. 21, 2022.

(30) Foreign Application Priority Data

Oct. 28, 2021 (CN) .......................... 202111261621.1

(51) Int. Cl.
*G06V 20/52* (2022.01)
*G06N 3/045* (2023.01)
(Continued)

(52) U.S. Cl.
CPC .............. *G06V 20/52* (2022.01); *G06N 3/045* (2023.01); *H04N 23/63* (2023.01); *H04N 23/71* (2023.01); *G06V 2201/07* (2022.01); *H04N 23/73* (2023.01)

(58) Field of Classification Search
CPC ...... G06N 3/045; G06N 3/0464; G06V 10/82; G06V 10/806; H04N 23/61; H04N 23/70;
(Continued)

(56) References Cited

U.S. PATENT DOCUMENTS 11,138,464 B2 * 10/2021 Rampal ................. G06F 18/214
11,503,205 B2 * 11/2022 Chen ........................ H04N 5/76
(Continued)

FOREIGN PATENT DOCUMENTS

CN 104243832 A 12/2014
CN 107995422 A 5/2018
(Continued)

OTHER PUBLICATIONS

Sohaib et al, "Exposure Adjustment for Hyperspectral Cameras", Research School of Engineering, The Australian National University, Canberra ACT 0200, Australia, National ICT Australia (NICTA), Locked Bag 8001, Canberra, ACT, 2601.

*Primary Examiner* — Boubacar Abdou Tchoussou
(74) *Attorney, Agent, or Firm* — Price Heneveld LLP

(57) ABSTRACT

This application provides a camera shooting parameter adjustment method and apparatus, and an electronic device. The method includes: acquiring image feature information of a shot image, and performing salient object detection on the shot image based on the image feature information to obtain a salient object detection result; and adjusting a camera shooting parameter based on the image feature information and the salient object detection result.

13 Claims, 7 Drawing Sheets

(51) Int. Cl.
*H04N 23/63* (2023.01)
*H04N 23/71* (2023.01)
*H04N 23/73* (2023.01)

(58) Field of Classification Search
CPC ........ H04N 23/71; H04N 23/73; H04N 23/74; H04N 23/72
See application file for complete search history.

(56) References Cited

U.S. PATENT DOCUMENTS

| | | | |
|---|---|---|---|
| 11,977,319 B2* | 5/2024 | Galor Gluskin | ..... H04N 23/672 |
| 12,067,733 B2* | 8/2024 | Cui | ......................... G06V 20/46 |
| 2011/0129151 A1 | 6/2011 | Saito et al. | |
| 2021/0398294 A1* | 12/2021 | Cui | ....................... G06F 18/214 |
| 2022/0100054 A1* | 3/2022 | Galor Gluskin | ....... H04N 23/88 |
| 2023/0360374 A1* | 11/2023 | Okuike | ................. H04N 23/76 |
| 2024/0163566 A1 | 5/2024 | Hu | |

FOREIGN PATENT DOCUMENTS

| | | |
|---|---|---|
| CN | 110602384 A | 12/2019 |
| CN | 111246091 A | 6/2020 |
| CN | 113507570 A | 10/2021 |
| CN | 113989387 A | 1/2022 |
| EP | 4380179 A1 | 6/2024 |
| WO | 2018018771 A1 | 2/2018 |

* cited by examiner

CAMERA SHOOTING PARAMETER ADJUSTMENT METHOD AND APPARATUS, AND ELECTRONIC DEVICE

CROSS-REFERENCE TO RELATED APPLICATIONS

This application is a Bypass continuation application of PCT International Application No. PCT/CN2022/126667 filed on Oct. 21, 2022, which claims priority to Chinese Patent Application No. 202111261621.1, filed in China on Oct. 28, 2021, which are incorporated herein by reference in their entireties.

TECHNICAL FIELD

This application relates to the field of communication technologies, and in particular, to a camera shooting parameter adjustment method and apparatus, and an electronic device.

BACKGROUND

As electronic devices have become more widespread, their functionality has been significantly improved. Electronic devices integrated with a camera can meet people's daily photography needs. Currently, when shooting with an electronic device, a photographer adjusts a camera shooting parameter based on shooting experience. To achieve a desirable shooting effect, the photographer needs to repeatedly adjust the camera shooting parameter, resulting in low adjustment efficiency of the camera shooting parameter.

SUMMARY

Embodiments of this application provide a camera shooting parameter adjustment method and apparatus, and an electronic device.

According to a first aspect, an embodiment of this application provides a camera shooting parameter adjustment method, where the method includes:
  acquiring image feature information of a shot image, and performing salient object detection on the shot image based on the image feature information to obtain a salient object detection result; and
  adjusting a camera shooting parameter based on the image feature information and the salient object detection result.

According to a second aspect, an embodiment of this application provides a camera shooting parameter adjustment apparatus, where the apparatus includes:
  an acquiring module, configured to acquire image feature information of a shot image, and perform salient object detection on the shot image based on the image feature information to obtain a salient object detection result; and
  an adjusting module, configured to adjust a camera shooting parameter based on the image feature information and the salient object detection result.

According to a third aspect, an embodiment of this application provides an electronic device, where the electronic device includes a processor, a memory, and a program or instructions stored in the memory and capable of running on the processor, and when the program or instructions are executed by the processor, the steps of the camera shooting parameter adjustment method according to the first aspect are implemented.

According to a fourth aspect, an embodiment of this application provides a readable storage medium, where the readable storage medium stores a program or instructions, and when the program or instructions are executed by a processor, the steps of the camera shooting parameter adjustment method according to the first aspect are implemented.

According to a fifth aspect, an embodiment of this application provides a chip. The chip includes a processor and a communication interface, where the communication interface is coupled to the processor, and the processor is configured to run a program or instructions to implement the method according to the first aspect.

DESCRIPTION OF EMBODIMENTS

The following clearly describes the technical solutions in the embodiments of this application with reference to the accompanying drawings in the embodiments of this application. Apparently, the described embodiments are merely some rather than all of the embodiments of this application. All other embodiments obtained by persons of ordinary skill in the art based on the embodiments of this application without creative efforts shall fall within the protection scope of this application.

The terms "first", "second", and the like in the specification and claims of this application are used to distinguish between similar objects rather than to describe a specific order or sequence. It should be understood that data used in this way are interchangeable in appropriate circumstances such that the embodiments of this application can be implemented in an order other than those illustrated or described herein. In addition, "first", "second", and the like are typically used to distinguish objects of a same type and do not limit a quantity of the objects. For example, there may be one or more first objects. In addition, "and/or" in the specification and claims represents at least one of connected objects, and the character "/" generally indicates that the contextually associated objects have an "or" relationship.

The following describes in detail the camera shooting parameter adjustment method provided in the embodiments of this application through specific embodiments and application scenarios thereof with reference to the accompanying drawings.

Figure 1:
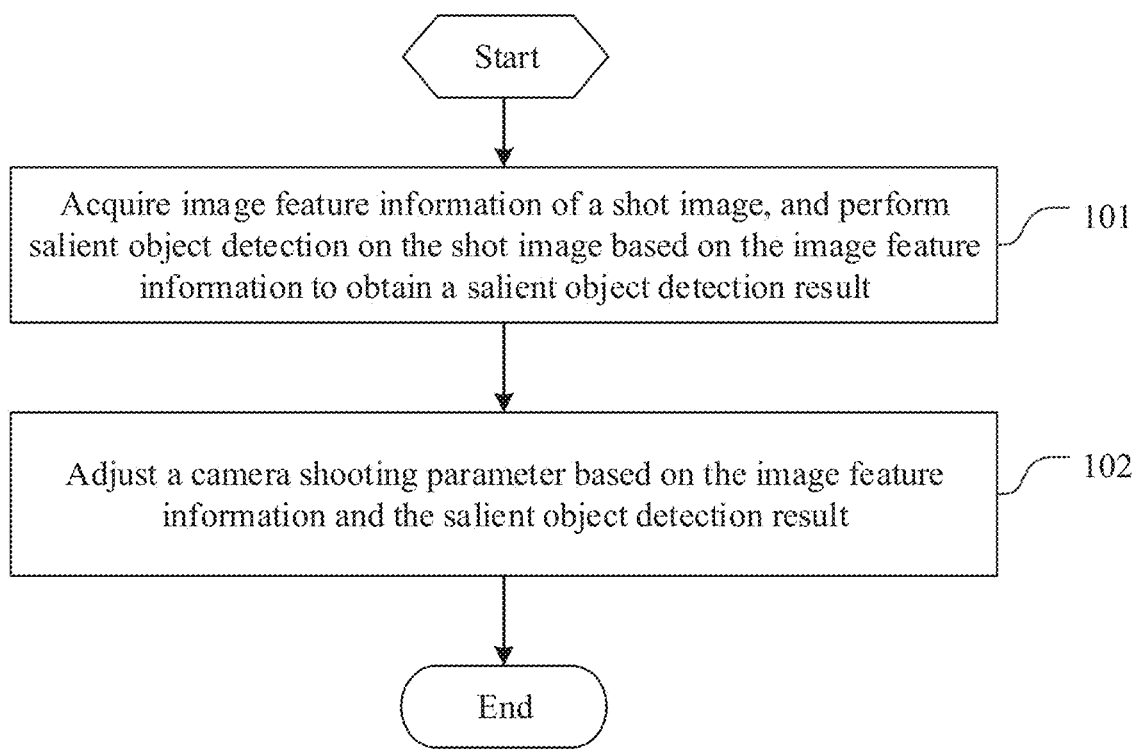
FIG. 1 is a flowchart of a camera shooting parameter adjustment method according to an embodiment of this application.

Refer to FIG. 1. FIG. 1 is a flowchart of a camera shooting parameter adjustment method according to an embodiment of this application. As shown in FIG. 1, the method includes the following steps.

Step 101. Acquire image feature information of a shot image, and perform salient object detection on the shot image based on the image feature information to obtain a salient object detection result.

The shot image may be any image shot by a camera. Feature extraction may be performed on the shot image based on a first sub-network model to obtain image feature information. For example, the shot image may be inputted into the first sub-network model for feature extraction to obtain image feature information. Salient object detection may be performed on the image feature information based on a second sub-network model to obtain a salient object detection result. Salient object detection (SOD) can be used for finding and labeling the most prominent object, that is, a salient object, in an image or a video. The salient object detection result can be used for image editing and synthesis, and the like.

Step 102. Adjust a camera shooting parameter based on the image feature information and the salient object detection result.

The camera shooting parameter may include exposure parameter, white balance parameter, aperture parameter, backlight compensation parameter, and the like. For example, the camera shooting parameter may be any one or more of exposure parameter, white balance parameter, aperture parameter, and backlight compensation parameter.

In addition, a target shooting parameter may be acquired based on the image feature information and the salient object detection result, and the camera shooting parameter is adjusted based on the target shooting parameter. The target shooting parameter may be any one or more of target exposure parameter, target white balance parameter, target aperture parameter, and target backlight compensation parameter. For example, the image feature information and the salient object detection result may be inputted into a third sub-network model for shooting parameter prediction to obtain the target shooting parameter. Alternatively, the target shooting parameter may be acquired based on the image feature information and the salient object detection result, and the camera shooting parameter is adjusted based on the target shooting parameter.

It should be noted that the shot image may be predicted based on a neural network model to obtain a target image parameter, and the camera shooting parameter is adjusted based on the target image parameter, where the neural network model may be used for predicting an image parameter based on the image feature information of the shot image and the salient object detection result corresponding to the shot image.

Figure 2:
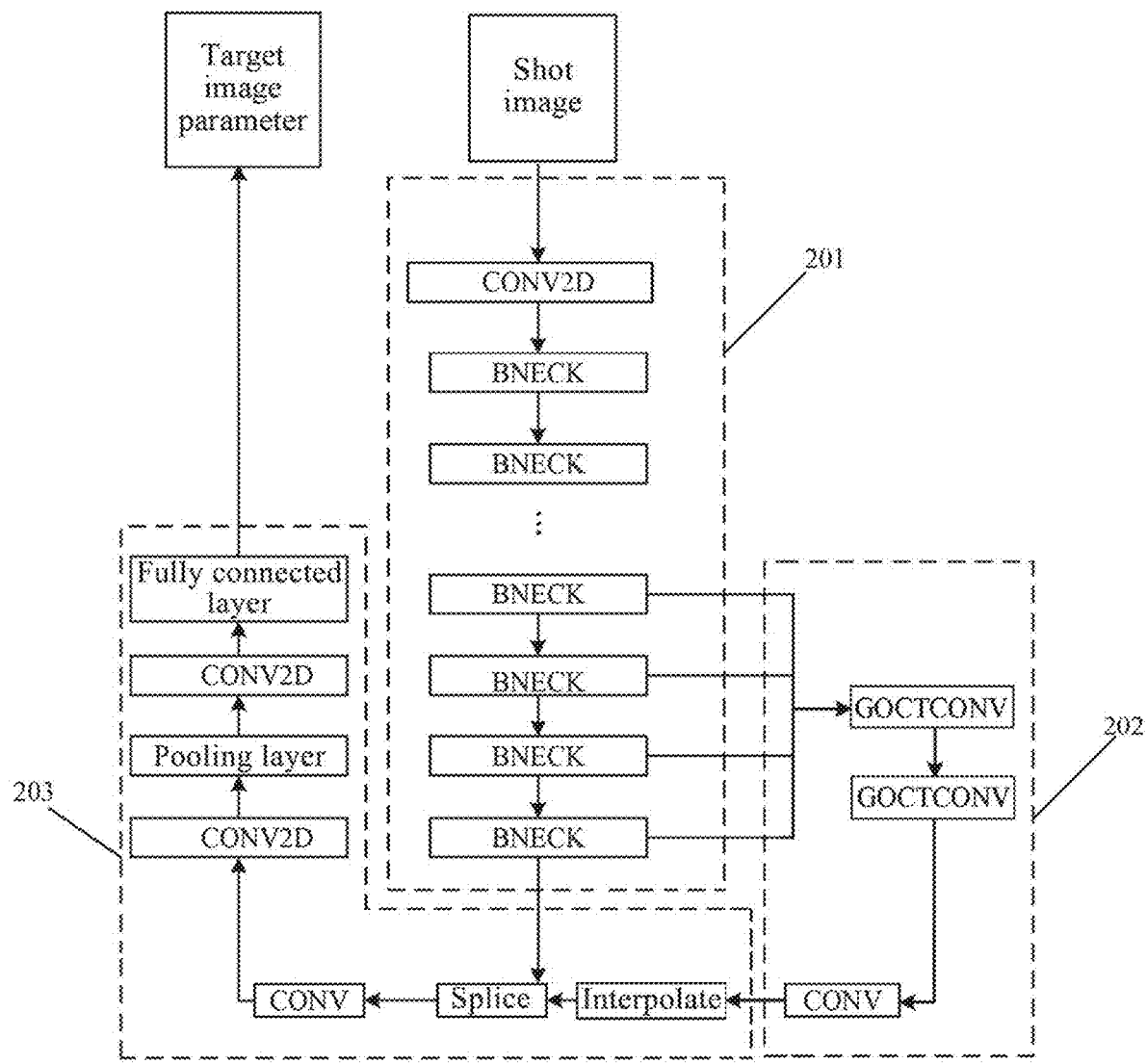
FIG. 2 is a schematic structural diagram of a neural network model according to an embodiment of this application.

In an embodiment, as shown in FIG. 2, the neural network model may include a first sub-network model 201 for feature extraction, a second sub-network model 202 for salient object detection, and a third sub-network model 203 for image parameter prediction. The first sub-network model 201 may be a MobilenetV3 model, and the MobilenetV3 model is a convolutional neural network model. The MobilenetV3 model may include a conv2d (that is, CONV2D) layer and multiple bneck (that is, BNECK) layers, where the bneck layers may be used for image feature extraction. The second sub-network model 202 may be a lightweight network model CSE CSF can perform cross-domain feature fusion. CSF may include a gOctConv layer, where gOctConv is a generalized octave convolution (OctConv). The third sub-network model 203 may include a conv2d layer, a pooling layer, a conv2d layer, and a fully connected layer that are connected in sequence. The conv2d layer can implement a two-dimensional convolution computation.

It should be noted that the lightweight network model CSF may include a feature extractor and a cross-stage fusion component and can simultaneously process features of multiple scales. The feature extractor is stacked together with in-layer multi-scale blocks (ILBlocks) and divided into four stages based on resolution of a feature map, and includes 3, 4, 6, and 4 ILBlocks at each stage. The cross-stage fusion component including gOctConv processes features from each stage of the feature extractor to obtain high-resolution output. gOctConv is used for introducing features of multiple scales into the ILBlock. By eliminating cross-scale computation, gOctConv makes each input channel correspond to an output channel with the same resolution.

In an embodiment, a MobilenetV3 model may be used as a backbone of a neural network model to extract deep and shallow image features of a shot image. With use of the last four layers of features of the backbone of the neural network model, CSF is used to perform cross-domain feature fusion for salient object detection of the shot image, so as to obtain a salient object detection result. The salient object detection result and the last layer of features of the backbone of the neural network model are fused to obtain fusion feature information. Image parameter prediction is performed based on the fusion feature information to obtain a target image parameter.

In an embodiment, the target image parameter being a target reflectivity is used as an example. During training of the neural network model, a picture may be acquired, and a reflectivity of the picture is labeled as a training sample of the neural network model. During picture acquisition, pictures in DNG and JPG formats can be saved through automatic exposure in a professional mode of a camera. For one shooting scenario, an image with a gray card placed and an image with the gray card removed, that is, an image with no gray card placed, are separately shot. For example, while a chair is being shot, an image may be shot when no gray card is placed on the chair, and another image is shot when a gray card is placed on the chair. The reflectivity of an object is calculated using the following formula: $lux \times r \times K = brightness$, where lux represents incident illuminance, r represents the reflectivity of the object, K represents a relevant constant of the camera, and brightness represents image brightness. For an image with a gray card placed, an average brightness of the gray card portion is acquired. Given that a reflectivity of the gray card is 18%, the calculation is as follows: $lux \times K = brightness/18$. Since K is given, a value of lux can be calculated. For an image with no gray card placed, an average brightness of an object portion is acquired, and based on the lux value calculated using the above formula, the reflectivity of the object is calculated as follows: $r = brightness/lux \times K$. In this way, picture acquisition in this shooting scenario and picture reflectivity labeling can be implemented. The acquired picture and the labeled picture reflectivity may be inputted into the neural network model for training the neural network model, and the neural network model obtained after training can be used for predicting reflectivity. In this way, the neural network model is used for predicting reflectivity to fulfill a reflectivity regression task, such that joint learning can be performed on a salient object detection task and the reflectivity regression task through a deep learning technology, and a salient detection feature is fused into the reflectivity regression task, thereby achieving better reflectivity prediction.

In an embodiment, the target image parameter being a target image brightness is used as an example. During training of the neural network model, a picture may be acquired, and a first image brightness of the picture is labeled as a training sample of the neural network model. The first image brightness is an image brightness with a good display effect of the picture. During picture acquisition, a camera may be used to shoot a picture through automatic exposure and then shoot a picture at an appropriate exposure position through manual exposure adjustment, and a picture brightness obtained after exposure adjustment is recorded as the first image brightness. The picture obtained through automatic exposure and the first image brightness of the picture are used as training samples for training the neural network model. For example, when an average brightness of a picture is 155, it indicates an apparent overexposure. After manual exposure adjustment, an image brightness allowing for a good effect is 100. Therefore, the first image brightness is determined to be 100. The neural network model obtained after training can be used for predicting an image brightness allowing for a good display effect of a picture. Optionally, the image brightness allowing for a good display effect means that a difference between brightness of a target object seen by human eyes and brightness of the target object in a picture is less than or equal to a preset value.

In the embodiments of this application, the image feature information of the shot image is acquired, and salient object detection is performed on the shot image based on the image feature information to obtain the salient object detection result; and the camera shooting parameter is adjusted based on the image feature information and the salient object detection result. The camera shooting parameter is adjusted in combination with salient object detection, such that the camera shooting parameter can be automatically adjusted without being repeatedly adjusted by photographers, improving the adjustment efficiency of the camera shooting parameter.

Optionally, the adjusting a camera shooting parameter based on the image feature information and the salient object detection result includes:
acquiring a target image parameter based on the image feature information and the salient object detection result; and
adjusting the camera shooting parameter based on the target image parameter.

The target image parameter may include target image brightness, target reflectivity, target tone, target depth of field, and the like. For example, the target image parameter may be any one or more of target image brightness, target reflectivity, target tone, and target depth of field.

In an embodiment, the salient object detection result and target feature information are fused to obtain fusion feature information, where the target feature information is all or part of the image feature information; and image parameter prediction is performed on the fusion feature information based on a third sub-network model to obtain a target image parameter.

In an embodiment, the target image parameter being a target image brightness is used as an example. A camera exposure parameter may be adjusted based on a target image brightness obtained through prediction, such that an overall average image brightness is the same as the predicted target image brightness. In this way, exposure control can be assisted by directly predicting an image brightness allowing for a good effect of the image.

In this embodiment, the target image parameter is acquired based on the image feature information and the salient object detection result, and the camera shooting parameter is adjusted based on the target image parameter, such that an image parameter can be predicted in combination with salient object detection, and the camera shooting parameter is adjusted based on the image parameter, thereby improving the adjustment efficiency of the camera shooting parameter.

Optionally, the adjusting a camera shooting parameter based on the image feature information and the salient object detection result includes:
fusing the salient object detection result and target feature information to obtain fusion feature information, where the target feature information is all or part of the image feature information; and
adjusting the camera shooting parameter based on the fusion feature information.

Feature extraction may be performed on a shot image based on a first sub-network model to obtain the image feature information; salient object detection is performed on the image feature information based on a second sub-network model to obtain the salient object detection result; and the salient object detection result and the target feature information are fused to obtain the fusion feature information, where the target feature information is all or part of the image feature information. Parameter prediction may be performed on the fusion feature information based on a third sub-network model to obtain the target image parameter or the target shooting parameter, and the camera shooting parameter is adjusted based on the target image parameter or the target shooting parameter. In this way, the salient object detection result is fused into an image parameter prediction task through a deep learning technology, such that a camera shooting parameter allowing for a good effect can be obtained.

In addition, the first sub-network model may be a convolutional neural network, a fully connected neural model, a recurrent neural network, and/or the like. A model structure of the first sub-network model is not limited in this embodiment. For example, the first sub-network model may be a MobilenetV3 model. The second sub-network model may be a convolutional neural network, a fully connected neural model, a recurrent neural network, and/or the like. A model structure of the second sub-network model is not limited in this embodiment. For example, the second sub-network model may be a CSF model. The third sub-network model may be a convolutional neural network, a fully connected neural model, a recurrent neural network, and/or the like. A model structure of the third sub-network model is not limited in this embodiment. For example, the third sub-network model may include a convolutional layer (Conv), an average pooling layer (avgpool), and a fully connected layer that are connected in sequence.

In an embodiment, as shown in FIG. 2, a MobilenetV3 model may be used as a backbone of a neural network model to extract deep and shallow image features of a shot image. The last four layers of features of the backbone of the neural network model may be used for cross-domain feature fusion using CSF. CSF uses gOctConv (namely, GOCTCONV) to take features having different scales from the last convolution at each stage in the last four layers in the backbone as an input and performs cross-stage convolution to output features having different scales. To extract multi-scale features in a granularity level, each scale of the feature is processed through a set of parallel convolutions with different expansion rates. Then, the features are sent to another gOctConv for 1×1 convolution to generate higher-resolution features, and then the higher-resolution features are sent to another gOctConv for standard 1×1 convolution (Cony, namely, CONV) to output a salient object detection result sod_result of a salient image. The salient object detection result is interpolated, spliced with the target feature information, subjected to a convolution operation, and then inputted into a conv2d layer.

It should be noted that during training of a neural network model, to reduce labeling work for a training sample, a teacher model csnet may be used for performing salient object detection on a sample image, a detection result is used as a salient object detection result of the sample image, and therefore it is unnecessary to label the sample image with the salient object detection result.

In an embodiment, the third sub-network model may include a convolutional layer, an average pooling layer, and a fully connected layer. For example, the convolutional layer, the average pooling layer, and the fully connected layer are connected in sequence, where the fusion feature information is inputted into the convolutional layer, and the fully connected layer outputs the target image parameter.

In this embodiment, the salient object detection result and target feature information are fused to obtain fusion feature information, where the target feature information is all or part of the image feature information; and the camera shooting parameter is adjusted based on the fusion feature information. In this way, the salient object detection result is fused into an image parameter prediction task, such that a camera shooting parameter allowing for a good effect can be obtained.

Optionally, the fusing the salient object detection result and target feature information to obtain fusion feature information includes:
    splicing the salient object detection result and the target feature information to obtain spliced information; and
    performing residual connection processing on the spliced information and the target feature information to obtain the fusion feature information.

The spliced information may be information obtained after the salient object detection result and the target feature information are spliced. The salient object detection result and the target feature information may be spliced in a channel dimension to obtain the spliced information. The performing residual connection processing on the spliced information and the target feature information may be: performing splicing fusion on the spliced information through a convolutional layer to obtain a fused feature, and adding the fused feature to the target feature information to perform residual connection processing so as to obtain the fusion feature information.

In an embodiment, the output of the last layer of the backbone of the neural network model, to be specific, feature_out of the last layer of feature of mobilnetv3, and the salient object detection result sod_result may be spliced in a channel dimension; after splicing, feature fusion is performed through a layer for 1×1 convolution to obtain a fused feature feature_add_sod; and the fused feature feature_add_sod is added to the feature_out of the last layer to implement residual connection processing, and then the fusion feature information is obtained.

In this embodiment, the salient object detection result and the target feature information are spliced to obtain the spliced information, and residual connection processing is performed on the spliced information and the target feature information to obtain the fusion feature information, such that multiple layers of image features and the salient object detection result can be fused better.

Optionally, the acquiring image feature information of a shot image includes:
    performing feature extraction on the shot image based on a first sub-network model to obtain the image feature information of the shot image, where
    the first sub-network model includes multiple network layers connected in sequence, and the image feature information includes feature information outputted by at least one of the multiple network layers; and
    the target feature information includes feature information outputted by some or all of the at least one network layer.

The image feature information may include feature information outputted by at least two of the multiple network layers, where the at least two network layers are connected in sequence. The at least one network layer may include the last network layer of the first sub-network model. The target feature information may include feature information outputted by the last network layer of the first sub-network model.

In an embodiment, the first sub-network model may be a MobilenetV3 model. The MobilenetV3 model may include multiple bneck layers, and the image feature information may include feature information outputted by the last four bneck layers. The target feature information may be feature information outputted by the last bneck layer.

In this embodiment, the first sub-network model includes multiple network layers connected in sequence; the image feature information includes feature information outputted by at least one of the multiple network layers; and the target feature information includes feature information outputted by some or all of the at least one network layer. In this way, multiple layers of image features and the salient object detection result are fused, achieving better image parameter prediction.

Optionally, the target image parameter includes a target reflectivity, the camera shooting parameter includes an exposure parameter, and the adjusting the camera shooting parameter based on the target image parameter includes:
    determining a brightness adjustment parameter based on a difference between the target reflectivity and a preset reflectivity; and
    adjusting the exposure parameter based on the brightness adjustment parameter.

The preset reflectivity may be 18%, 17%, or another value. This is not limited in this embodiment. The brightness adjustment parameter may be related to the target reflectivity and a preset reflectivity. For example, the brightness adjustment parameter may be the difference between the target reflectivity and the preset reflectivity. Alternatively, the brightness adjustment parameter may be a product of a first preset coefficient and the difference between the target reflectivity and the preset reflectivity. The first preset coefficient may be 0.1, 1.1, 2, or the like, and this is not limited in this embodiment. In a case that the difference between the target reflectivity and the preset reflectivity is greater than 0, the brightness adjustment parameter indicates that image brightness is to be increased. In a case that the difference between the target reflectivity and the preset reflectivity is less than 0, the brightness adjustment parameter indicates that the image brightness is to be decreased.

In addition, the brightness adjustment parameter may be related to a ratio of the difference between the target reflectivity and the preset reflectivity to the preset reflectivity. For example, the brightness adjustment parameter may be the ratio of the difference between the target reflectivity and the preset reflectivity to the preset reflectivity. Alternatively, the brightness adjustment parameter may be a product of a second preset coefficient and the ratio of the difference between the target reflectivity and the preset reflectivity to the preset reflectivity. The second preset coefficient may be 0.9, 1.1, 1.3, or the like, and this is not limited in this embodiment. The brightness adjustment parameter may be used for representing a percentage of a to-be-increased brightness or to-be-deceased brightness. In a case that the brightness adjustment parameter is greater than 0, the brightness adjustment parameter is the percentage of the to-be-increased brightness; in a case that the brightness adjustment parameter is less than 0, the brightness adjustment parameter is the percentage of the to-be-decreased brightness; and so on. This is not limited in this embodiment.

In an embodiment, the difference between the target reflectivity and the preset reflectivity may be calculated, a ratio of the difference to the preset reflectivity is calculated, a proportion of a salient object obtained through salient object detection in the shot image is calculated, and the brightness adjustment parameter may be determined based on the ratio of the difference to the preset reflectivity and the proportion of the salient object in the shot image. For example, a target product may be determined, and the target product is a product of the ratio of the difference to the preset reflectivity and the proportion of the salient object in the shot image, where the brightness adjustment parameter may be related to the target product. For example, the brightness adjustment parameter may be the target product, a product of the target product and a third preset coefficient, or the like. The third preset coefficient may be 0.9, 1.1, 1.3, or the like. This is not limited in this embodiment.

For example, when it is assumed that the target reflectivity is 30, as compared with 18%, the target reflectivity 30 is greater than 18, indicating that the image brightness is to be increased, and the brightness adjustment parameter may be: (30−18)/18=12/18=66%, to be specific, the image brightness may be increased by 66%. During actual use, image adjustment parameter setting may be adjusted based on an actual use effect. This is not limited in this embodiment.

In addition, after the brightness adjustment parameter is determined, the exposure parameter may be adjusted based on the brightness adjustment parameter to make the image brightness satisfy the brightness adjustment parameter. For example, when the image brightness of the shot image is a, the brightness adjustment parameter indicates that the image brightness is to be increased by 66%, and then the exposure parameter may be adjusted to make the image brightness be increased by 66%. Adjusting the exposure parameter may be adjusting light sensitivity (ISO), and/or shutter speed, and the like.

It should be noted that with the rapid development of camera performance of mobile phones and the increasing demand for aesthetic image shooting, people increasingly desire that shot objects are close to what human eyes see, that is, a relatively high fidelity. Exposure control is a significant factor that affects the fidelity of shot images. Exposure control is mainly used for adjusting image brightness. In the related art, during photographing, people usually use an automatic exposure setting, that is, the camera automatically controls exposure. During automatic exposure control of the camera, two main steps, metering and exposure adjustment, are involved, where metering refers to operations of measuring intensity of light reflected by a current object and then adjusting exposure based on an image brightness obtained such that the image brightness is close to a real brightness of the object. The reflectivity of an object can represent light reflection capability of the object and is related to the properties of the object, for example, material and surface roughness of the object. During exposure adjustment, there is a principle called "18% gray" in the related art, to be specific, it is assumed that an overall average reflectivity of an image is 18%. This is because 18% gray can exhibit most of views perceived by human eyes. Cameras employ this principle as a basis for exposure and can obtain substantially accurate exposure results under most circumstances. However, on the basis of the assumption of "18% gray", when the shooting scenario is a scenario with a high reflectivity, for example, a snow-covered landscape or a white desk, underexposure occurs, resulting in formation of a grayish image. While the shooting scenario is a scenario with a low reflectivity, for example, a black desk or a black car, overexposure occurs, resulting in formation of a bright image. In this embodiment, whether a current shooting scenario is bright or dark is acquired by predicting the reflectivity of the shooting scenario, so as to assist exposure control adjustment, thereby improving an image shooting effect.

In this embodiment, the brightness adjustment parameter is determined based on the target reflectivity and the preset reflectivity, and the exposure parameter is adjusted based on the brightness adjustment parameter. In this way, the reflectivity can be predicted in combination with the salient detection result, and the exposure parameter is adjusted based on the reflectivity predicted, such that the exposure parameter of the camera can be automatically adjusted without being repeatedly adjusted by photographers, improving camera exposure parameter adjustment efficiency and also improving camera exposure control effect.

It should be noted that the camera shooting parameter adjustment method provided in this embodiment of this application may be performed by a camera shooting parameter adjustment apparatus or a control module for performing the camera shooting parameter adjustment method in the camera shooting parameter adjustment apparatus. In the embodiments of this application, the camera shooting parameter adjustment apparatus provided in the embodiments of this application is described by using an example in which a camera shooting parameter adjustment apparatus performs a camera shooting parameter adjustment method.

Figure 3:
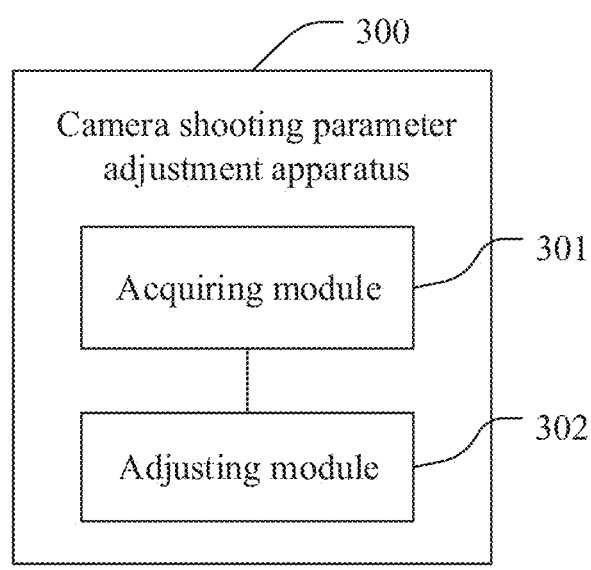
FIG. 3 is a first schematic structural diagram of a camera shooting parameter adjustment apparatus according to an embodiment of this application.

Refer to FIG. 3. FIG. 3 is a schematic structural diagram of a camera shooting parameter adjustment apparatus according to an embodiment of this application. As shown in FIG. 3, the apparatus 300 includes:

an acquiring module 301, configured to acquire image feature information of a shot image, and perform salient object detection on the shot image based on the image feature information to obtain a salient object detection result; and an adjusting module 302, configured to adjust a camera shooting parameter based on the image feature information and the salient object detection result.

Figure 4:
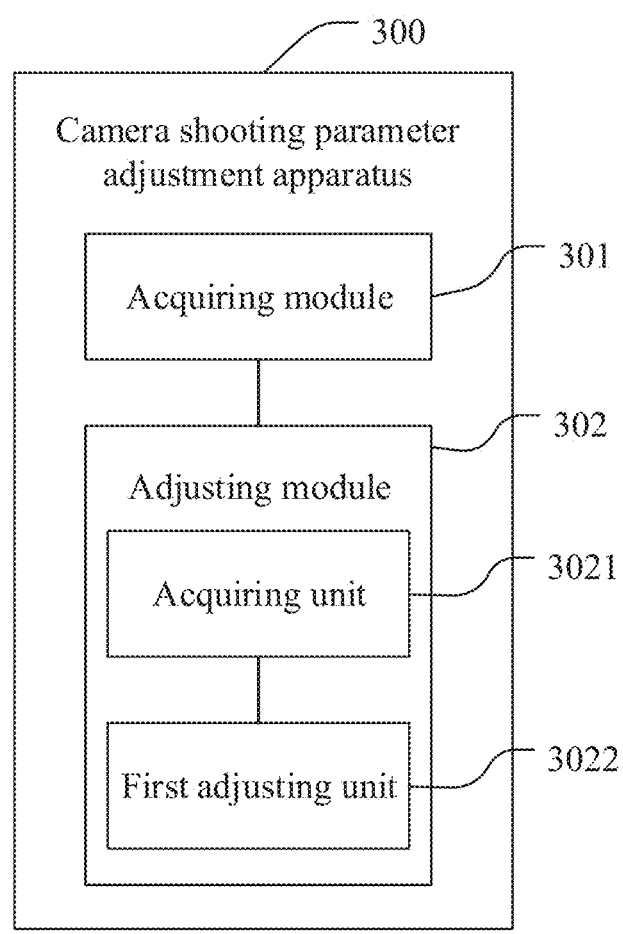
FIG. 4 is a second schematic structural diagram of a camera shooting parameter adjustment apparatus according to an embodiment of this application.

Optionally, as shown in FIG. 4, the adjusting module 302 includes:

an acquiring unit 3021, configured to acquire a target image parameter based on the image feature information and the salient object detection result; and a first adjusting unit 3022, configured to adjust the camera shooting parameter based on the target image parameter.

Figure 5:
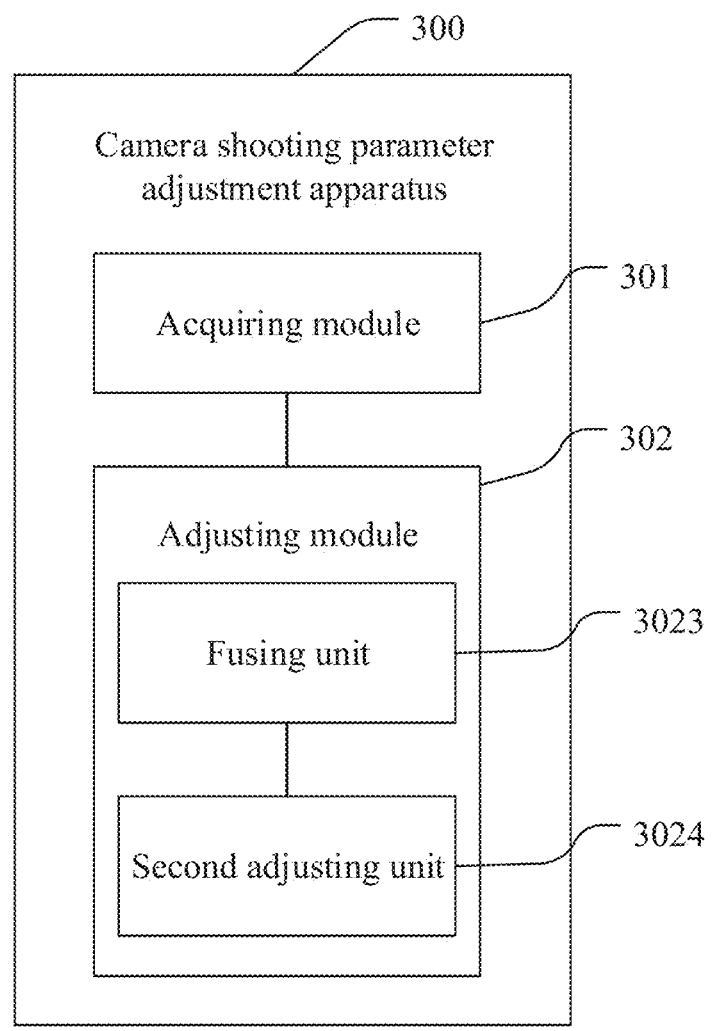
FIG. 5 is a third schematic structural diagram of a camera shooting parameter adjustment apparatus according to an embodiment of this application.

Optionally, as shown in FIG. 5, the adjusting module 302 includes:

a fusing unit 3023, configured to fuse the salient object detection result and target feature information to obtain fusion feature information, where the target feature information is all or part of the image feature information; and a second adjusting unit 3024, configured to adjust the camera shooting parameter based on the fusion feature information.

Optionally, the fusing unit 3023 is specifically configured to:

splice the salient object detection result and the target feature information to obtain spliced information; and perform residual connection processing on the spliced information and the target feature information to obtain the fusion feature information.

Optionally, the acquiring module 301 is specifically configured to:

perform feature extraction on the shot image based on a first sub-network model to obtain the image feature information of the shot image; and perform salient object detection on the shot image based on the image feature information to obtain a salient object detection result; where the first sub-network model includes multiple network layers connected in sequence; the image feature information includes feature information outputted by at least one of the multiple network layers; and the target feature information includes feature information outputted by some or all of the at least one network layer.

Optionally, the target image parameter includes a target reflectivity, the camera shooting parameter includes an exposure parameter, and the first adjusting unit 3022 is specifically configured to:

determine a brightness adjustment parameter based on a difference between the target reflectivity and a preset reflectivity; and adjust the exposure parameter based on the brightness adjustment parameter.

In this embodiment of this application, the acquiring module is configured to acquire the image feature information of the shot image and perform salient object detection on the shot image based on the image feature information to obtain the salient object detection result; and the adjusting module is configured to adjust, based on the image feature information and the salient object detection result, the camera shooting parameter. In this way, the camera shooting parameter is adjusted in combination with salient object detection, such that the camera shooting parameter can be automatically adjusted without being repeatedly adjusted by photographers, improving the adjustment efficiency of the camera shooting parameter.

The camera shooting parameter adjustment apparatus in this embodiment of this application may be an apparatus or a component, integrated circuit, or chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network-attached storage (NAS), a personal computer (PC), a television (TV), a teller machine, a self-service machine, or the like. This is not specifically limited in this embodiment of this application.

The camera shooting parameter adjustment apparatus in this embodiment of this application may be an apparatus having an operating system. The operating system may be an android operating system, an iOS operating system, or other possible operating systems. This is not specifically limited in this embodiment of this application.

The camera shooting parameter adjustment apparatus provided in this embodiment of this application can implement the processes implemented in the method embodiment in FIG. 1. To avoid repetition, details are not described herein again.

Figure 6:
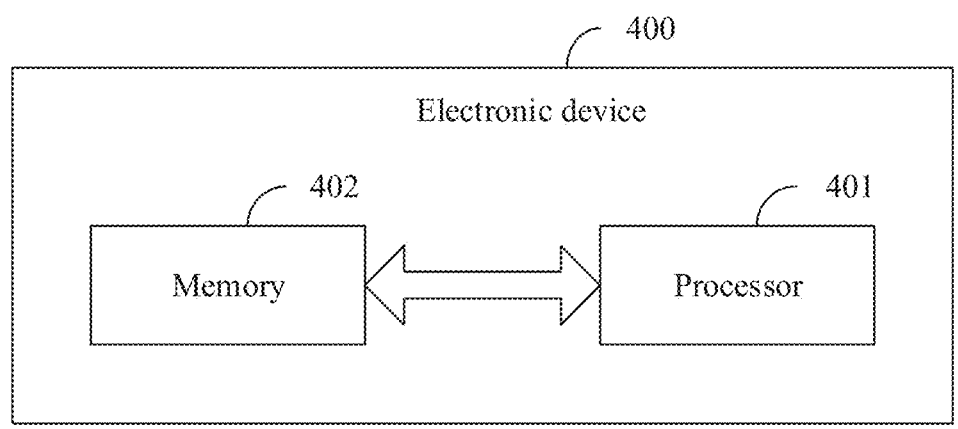
FIG. 6 is a schematic structural diagram of an electronic device according to an embodiment of this application.

Optionally, as shown in FIG. 6, an embodiment of this application further provides an electronic device 400 including a processor 401, a memory 402, and a program or instructions stored in the memory 402 and capable of running on the processor 401. When the program or instructions are executed by the processor 401, the processes of the foregoing camera shooting parameter adjustment method embodiment are implemented, with the same technical effects achieved. To avoid repetition, details are not described herein again.

It should be noted that the electronic device in this embodiment of this application includes the above-mentioned mobile electronic device and non-mobile electronic device.

Figure 7:
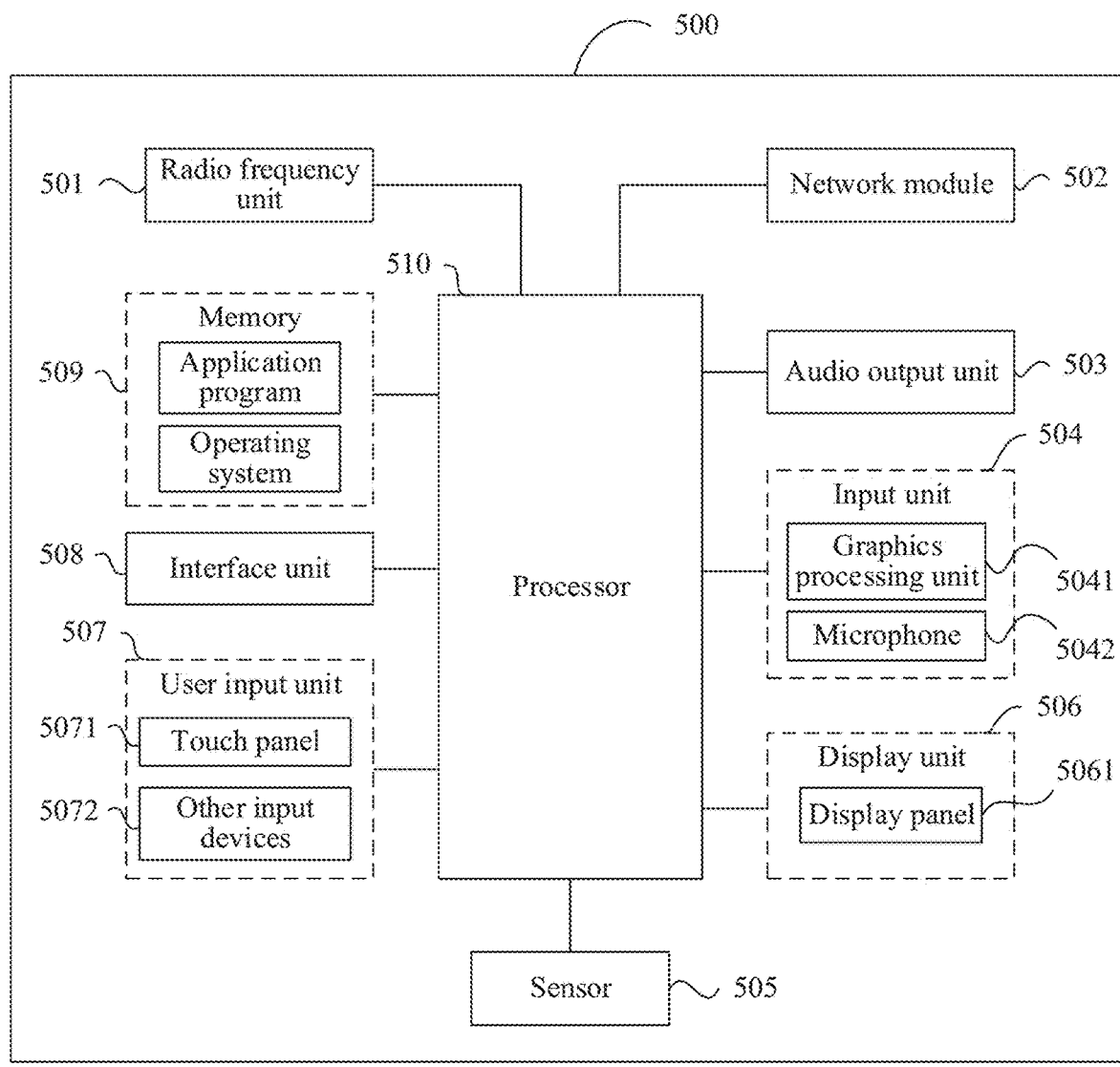
FIG. 7 is a schematic diagram of a hardware structure of an electronic device according to an embodiment of this application.

FIG. 7 is a schematic structural diagram of a hardware structure of an electronic device according to an embodiment of this application.

The electronic device 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

It can be understood by persons skilled in the art that the electronic device 500 may further include a power supply (for example, a battery) that supplies power to the components. The power supply may be logically connected to the processor 510 via a power management system, such that functions such as charge management, discharge management, and power consumption management are implemented via the power management system. The structure of the electronic device shown in FIG. 7 does not constitute a limitation on the electronic device. The electronic device may include more or fewer components than shown in the drawing, or combine some of the components, or arrange the components differently. Details are not described herein again.

The processor 510 is configured to: acquire image feature information of a shot image, and perform salient object detection on the shot image based on the image feature information to obtain a salient object detection result.

The processor 510 is further configured to: adjust a camera shooting parameter based on the image feature information and the salient object detection result.

Optionally, that the processor 510 is configured to adjust a camera shooting parameter based on the image feature information and the salient object detection result includes:

acquiring a target image parameter based on the image feature information and the salient object detection result; and adjusting the camera shooting parameter based on the target image parameter.

Optionally, that the processor 510 is configured to adjust a camera shooting parameter based on the image feature information and the salient object detection result includes:

fusing the salient object detection result and target feature information to obtain fusion feature information, where the target feature information is all or part of the image feature information; and adjusting the camera shooting parameter based on the fusion feature information.

Optionally, that the processor 510 is configured to fuse the salient object detection result and the target feature information to obtain fusion feature information includes:

splicing the salient object detection result and the target feature information to obtain spliced information; and performing residual connection processing on the spliced information and the target feature information to obtain the fusion feature information.

Optionally, that the processor 510 is configured to acquire image feature information of a shot image includes:

performing feature extraction on the shot image based on a first sub-network model to obtain the image feature information of the shot image, where the first sub-network model includes multiple network layers connected in sequence, and the image feature information includes feature information outputted by at least one of the multiple network layers; and the target feature information includes feature information outputted by some or all of the at least one network layer.

Optionally, the target image parameter includes a target reflectivity, the camera shooting parameter includes an exposure parameter, and that the processor 510 is configured to adjust the camera shooting parameter based on the target image parameter includes:

determining a brightness adjustment parameter based on a difference between the target reflectivity and a preset reflectivity; and adjusting the exposure parameter based on the brightness adjustment parameter.

In this embodiment of this application, the processor 510 is configured to: acquire the image feature information of the shot image and perform salient object detection on the shot image based on the image feature information to obtain the salient object detection result; and the processor 510 is further configured to adjust, based on the image feature information and the salient object detection result, the camera shooting parameter. In this way, the camera shooting parameter is adjusted in combination with salient object detection, such that the camera shooting parameter can be automatically adjusted without being repeatedly adjusted by photographers, improving the adjustment efficiency of the camera shooting parameter.

It should be understood that in this embodiment of this application, the input unit 504 may include a graphics processing unit (GPU) 5041 and a microphone 5042. The graphics processing unit 5041 processes image data of a static picture or a video that is obtained by an image capture apparatus (for example, a camera) in a video capture mode or an image capture mode. The display unit 506 may include a display panel 5061. The display panel 5061 may be configured in a form of a liquid crystal display, an organic light-emitting diode display, or the like. The user input unit 507 includes a touch panel 5071 and other input devices 5072. The touch panel 5071 is also referred to as a touchscreen. The touch panel 5071 may include two parts: a touch detection apparatus and a touch controller. The other input devices 5072 may include but are not limited to a physical keyboard, a function button (for example, a volume control button or a power on/off button), a trackball, a mouse, and a joystick. Details are not described herein again. The memory 509 may be configured to store software programs and various data which include but are not limited to an application program and an operating system. The processor 510 may integrate an application processor and a modem processor. The application processor mainly processes an operating system, a user interface, an application program, and the like. The modem processor mainly processes wireless communication. It can be understood that the modem processor may alternatively be not integrated in the processor 510.

An embodiment of this application further provides a readable storage medium. The readable storage medium may be non-volatile or volatile. The readable storage medium stores a program or instructions. When the program or instructions are executed by a processor, the processes of the foregoing camera shooting parameter adjustment method embodiments are implemented, with the same technical effects achieved. To avoid repetition, details are not described herein again.

The processor is the processor in the electronic device in the foregoing embodiments. The readable storage medium includes a computer-readable storage medium such as a computer read-only memory (ROM), a random access memory (RAM), a magnetic disk, or an optical disc.

An embodiment of this application further provides a chip, where the chip includes a processor and a communication interface. The communication interface is coupled to the processor, and the processor is configured to run a program or instructions to implement the processes of the foregoing camera shooting parameter adjustment method embodiments, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that in this specification, the terms "include", "comprise", or any of their variants are intended to cover a non-exclusive inclusion, such that a process, a method, an article, or an apparatus that includes a series of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element. In addition, it should be noted that the scope of the method and apparatus in the embodiments of this application is not limited to executing the functions in an order shown or discussed, but may also include executing the functions in a substantially simultaneous manner or in a reverse order, depending on the functions involved. For example, the described methods may be executed in an order different from that described, and various steps may alternatively be added, omitted, or combined. In addition, features described with reference to some examples may be combined in other examples.

By means of the foregoing description of the implementations, persons skilled in the art may clearly understand that the methods in the foregoing embodiments may be implemented by software with a necessary general hardware platform. Certainly, the method in the foregoing embodiments may also be implemented by hardware. However, in many cases, the former is an example. Based on such an understanding, the technical solutions of this application essentially or the part contributing to the related art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other forms without departing from the principle of this application and the protection scope of the claims, and all such forms fall within the protection scope of this application.

What is claimed is:

1. A camera shooting parameter adjustment method, wherein the method comprises:
    acquiring image feature information of a shot image, and performing salient object detection on the shot image based on the image feature information to obtain a salient object detection result; and
    adjusting a camera shooting parameter based on the image feature information and the salient object detection result;
    the adjusting a camera shooting parameter based on the image feature information and the salient object detection result comprises:
    fusing the salient object detection result and target feature information to obtain fusion feature information, wherein the target feature information is all or part of the image feature information; and
    adjusting the camera shooting parameter based on the fusion feature information;
    wherein the fusing the salient object detection result and target feature information to obtain fusion feature information comprises:
    splicing the salient object detection result and the target feature information to obtain spliced information; and
    performing residual connection processing on the spliced information and the target feature information to obtain the fusion feature information.

2. The method according to claim 1, wherein the adjusting a camera shooting parameter based on the image feature information and the salient object detection result comprises:
    acquiring, based on the image feature information and the salient object detection result, a target image parameter; and
    adjusting the camera shooting parameter based on the target image parameter.

3. The method according to claim 1, wherein the acquiring image feature information of a shot image comprises:
    performing feature extraction on the shot image based on a first sub-network model to obtain the image feature information of the shot image, wherein
    the first sub-network model comprises multiple network layers connected in sequence, and the image feature information comprises feature information outputted by at least one of multiple network layers; and
    the target feature information comprises feature information outputted by some or all of the at least one network layer.

4. The method according to claim 2, wherein the target image parameter comprises a target reflectivity, the camera shooting parameter comprises an exposure parameter, and the adjusting the camera shooting parameter based on the target image parameter comprises:
    determining a brightness adjustment parameter based on a difference between the target reflectivity and a preset reflectivity; and
    adjusting the exposure parameter based on the brightness adjustment parameter.

5. An electronic device, comprising a processor, a memory, and a program or instructions stored in the memory and capable of running on the processor, wherein the program or instructions, when executed by the processor, causes the electronic device to perform:
    acquiring image feature information of a shot image, and performing salient object detection on the shot image based on the image feature information to obtain a salient object detection result; and
    adjusting a camera shooting parameter based on the image feature information and the salient object detection result;
    wherein when adjusting a camera shooting parameter based on the image feature information and the salient object detection result, the program or instructions, when executed by the processor, causes the electronic device to perform:
    fusing the salient object detection result and target feature information to obtain fusion feature information, wherein the target feature information is all or part of the image feature information; and
    adjusting the camera shooting parameter based on the fusion feature information;
    wherein when fusing the salient object detection result and target feature information to obtain fusion feature information, the program or instructions, when executed by the processor, causes the electronic device to perform:
    splicing the salient object detection result and the target feature information to obtain spliced information; and
    performing residual connection processing on the spliced information and the target feature information to obtain the fusion feature information.

6. The electronic device according to claim 5, wherein when adjusting a camera shooting parameter based on the image feature information and the salient object detection result, the program or instructions, when executed by the processor, causes the electronic device to perform:
    acquiring, based on the image feature information and the salient object detection result, a target image parameter; and
    adjusting the camera shooting parameter based on the target image parameter.

7. The electronic device according to claim 5, wherein when acquiring image feature information of a shot image, the program or instructions, when executed by the processor, causes the electronic device to perform:
    performing feature extraction on the shot image based on a first sub-network model to obtain the image feature information of the shot image, wherein
    the first sub-network model comprises multiple network layers connected in sequence, and the image feature information comprises feature information outputted by at least one of multiple network layers; and
    the target feature information comprises feature information outputted by some or all of the at least one network layer.

8. The electronic device according to claim 6, wherein the target image parameter comprises a target reflectivity, the camera shooting parameter comprises an exposure parameter, wherein when adjusting the camera shooting parameter based on the target image parameter, the program or instructions, when executed by the processor, causes the electronic device to perform:
- determining a brightness adjustment parameter based on a difference between the target reflectivity and a preset reflectivity; and
- adjusting the exposure parameter based on the brightness adjustment parameter.

9. A non-transitory readable storage medium, wherein the non-transitory readable storage medium stores a program or instructions, wherein the program or instructions, when executed by a processor of an electronic device, causes the processor of the electronic device to perform:
- acquiring image feature information of a shot image, and performing salient object detection on the shot image based on the image feature information to obtain a salient object detection result; and
- adjusting a camera shooting parameter based on the image feature information and the salient object detection result;
- when adjusting a camera shooting parameter based on the image feature information and the salient object detection result, the program or instructions, when executed by the processor of the electronic device, causes the processor of the electronic device to perform:
- fusing the salient object detection result and target feature information to obtain fusion feature information, wherein the target feature information is all or part of the image feature information; and
- adjusting the camera shooting parameter based on the fusion feature information;
- wherein when fusing the salient object detection result and target feature information to obtain fusion feature information, the program or instructions, when executed by the processor of the electronic device, causes the processor of the electronic device to perform:
- splicing the salient object detection result and the target feature information to obtain spliced information; and
- performing residual connection processing on the spliced information and the target feature information to obtain the fusion feature information.

10. The non-transitory readable storage medium according to claim 9, wherein when adjusting a camera shooting parameter based on the image feature information and the salient object detection result, the program or instructions, when executed by the processor of the electronic device, causes the processor of the electronic device to perform:
- acquiring, based on the image feature information and the salient object detection result, a target image parameter; and
- adjusting the camera shooting parameter based on the target image parameter.

11. The non-transitory readable storage medium according to claim 9, wherein when acquiring image feature information of a shot image, the program or instructions, when executed by the processor of the electronic device, causes the processor of the electronic device to perform:
- performing feature extraction on the shot image based on a first sub-network model to obtain the image feature information of the shot image, wherein
- the first sub-network model comprises multiple network layers connected in sequence, and the image feature information comprises feature information outputted by at least one of multiple network layers; and
- the target feature information comprises feature information outputted by some or all of the at least one network layer.

12. The non-transitory readable storage medium according to claim 10, wherein the target image parameter comprises a target reflectivity, the camera shooting parameter comprises an exposure parameter, wherein when adjusting the camera shooting parameter based on the target image parameter, the program or instructions, when executed by the processor of the electronic device, causes the processor of the electronic device to perform:
- determining a brightness adjustment parameter based on a difference between the target reflectivity and a preset reflectivity; and
- adjusting the exposure parameter based on the brightness adjustment parameter.

13. A chip, comprising a processor and a communication interface, wherein the communication interface is coupled to the processor, and the processor is configured to run a program or instructions to implement the steps of the camera shooting parameter adjustment method according to claim 1.

* * * * *